United States Patent
Nozaki et al.

(10) Patent No.: US 6,395,371 B1
(45) Date of Patent: May 28, 2002

(54) WEATHER STRIP

(75) Inventors: Masahiro Nozaki, Tsushima; Yoshihiro Miura, Ogaki, both of (JP)

(73) Assignee: Toyoda Gosei Co., Ltd., Aichi (JP)

(*) Notice: Subject to any disclaimer, the term of this patent is extended or adjusted under 35 U.S.C. 154(b) by 0 days.

(21) Appl. No.: 09/482,098

(22) Filed: Jan. 13, 2000

(30) Foreign Application Priority Data

Mar. 16, 1999 (JP) .............................. 11-070712

(51) Int. Cl.[7] .............................. C08J 9/04; C08L 23/16
(52) U.S. Cl. ...................... 428/122; 428/158; 428/159; 428/305.5; 428/315.5; 428/317.9
(58) Field of Search ................. 428/31, 305.5, 428/315.5, 317.9, 122, 159, 158

(56) References Cited

U.S. PATENT DOCUMENTS 5,766,703 A  6/1998  Mori et al. .................... 428/31
6,132,847 A * 11/2000  Okita et al. .................. 428/159

FOREIGN PATENT DOCUMENTS

| EP | 0296901 | 12/1988 |
| EP | 0522545 | 1/1993 |
| FR | 2647722 | 12/1990 |
| GB | 2147244 | 5/1985 |
| JP | 52-77324 | 6/1977 |
| JP | 6-340238 | 12/1994 |
| JP | 10-6379 | 1/1998 |
| WO | WO 84/03659 | 9/1984 |

* cited by examiner

Primary Examiner—Shrive P. Beck
Assistant Examiner—Elena Tsoy
(74) Attorney, Agent, or Firm—Pillsbury Winthrop LLP

(57) ABSTRACT

A weather strip of a rubber material, provided with a sectionally U-shaped flange gripping portion having an insert buried therein, gripping lip portions formed inside, and seal portions integrated with the flange gripping portion. At least the gripping lip portions are formed of microfoam rubber in which the specific gravity of vulcanizate is in a range of from 0.9 to 1.0.

1 Claim, 3 Drawing Sheets

WEATHER STRIP

BACKGROUND OF THE INVENTION

1. Field of the Invention

The present invention relates to a weather strip comprising a sectionally U-shaped flange gripping portion having an insert buried therein and gripping lip portions formed inside, and seal portions integrated with the flange gripping portion.

The present application is based on Japanese Patent Application No. Hei. 11-70712, which is incorporated herein by reference.

2. Description of the Related Art

The door opening-trimming weather strip shown in FIG. 1 or the trunk weather strip shown in FIG. 2 comprises a sectionally U-shaped flange gripping portion 14 having an insert 12 buried therein, a hollow seal portion 16 of sponge rubber, and a lip seal portion 18 of sponge rubber.

Generally, the flange gripping portion 14 including gripping lip portions 20 and 21 is formed of vulcanizate (solid rubber) of a nonfoam-recipe EPDM rubber composition by extrusion molding, or the like. On the other hand, the hollow seal portion 16 and the lip seal portion 18 are formed of vulcanizate (sponge rubber) of a foam-recipe EPDM rubber composition by extrusion molding so that the seal portions 16 and 18 are integrated with the flange gripping portion 14.

EPDM is excellent in weather resistance, ozone resistance, and so on. EPDM is also good in low-temperature characteristic. EPDM is easy to satisfy the required characteristic of weather strips. Accordingly, EPDM is used as a material for the weather strips.

Further, in the case of a weather strip configured as described above, the weather strip is bent two-dimensionally or three-dimensionally at least in corner regions when the weather strip is assembled to a flange portion 22 which is, for example, annularly formed in a circumferential edge of a door opening portion. The flange portion 22 not only has a double-ply region constituted by a combination of an outer panel 24 and an inner panel 25 as shown in FIGS. 1 and 2 but also generally has a single-ply region constituted by one panel or a triple-ply or quadruple-ply region constituted by a combination of two panels and one or two reinforcement panels interposed between the two panels.

Therefore, the shapes of the gripping lip portions 20 and 21 were set so that the largest insertion load required when the flange gripping portion of the weather strip was inserted onto the flange portion was set in accordance with the thickest region of the flange portion and the smallest extraction load required when the flange gripping portion was extracted from the flange portion was set in accordance with the thinnest region of the flange portion.

Further, in the case of the aforementioned weather strip, it is necessary to secure the smallest extraction load. This is for the reasons as follows. If the smallest extraction load is not secured, for example, the bent region tends to be restored to its original condition after the flange portion is fitted into the weather strip. As a result, the flange gripping portion is displaced in an extracting direction, so that the seal position is shifted from its normal position. There is a possibility of occurrence of a problem in sealing property.

If the smallest extraction load (the load required when the flange gripping portion is extracted from the thinnest region of the flange portion) is to be secured, the largest insertion load (the load required when the flange gripping portion is inserted into the thickest region of the flange portion) increases reversely. As a result, workability in fitting the weather strip to the flange portion is reduced.

Incidentally, it is thought of that the gripping force of the gripping lip portions is formed while the angle of inclination is changed in accordance with the plate thickness of the single-ply, double-ply or triple-ply region, or the like (Japanese Patent Publication No. Hei. 6-340238, Japanese Patent Publication No. Hei. 10-6379, and so on). The production by this method is, however, of no practical use because controlling is difficult.

It is further thought of that the gripping lip portions of the flange gripping portion are formed of sponge rubber for the purpose of reducing the largest insertion load (see Japanese Patent Publication No. Sho. 52-77324, etc.). When the gripping lip portions are formed of sponge rubber, the gripping force of the flange gripping portion is, however, insufficient so that it is impossible to secure the smallest extraction load.

SUMMARY OF THE INVENTION

Taking the above description into consideration, an object of the present invention is to provide a weather strip in which the smallest extraction load on a flange gripping portion can be secured while the largest insertion load is set in a standard range.

Although description will be made here about a door opening-trimming weather strip or a trunk weather strip provided in the automobile body by way of example, the description can be applied also to other weather strips such as a quarter window weather strip, a door weather strip, etc.

The inventors have found that the aforementioned problem can be solved when the flange gripping portion of the weather strip is formed of microfoam rubber with specific gravity in a predetermined range. As a result, the inventors have hit on the weather strip having the following configuration so as to solve the aforementioned problem.

That is, there is provided a weather strip of a rubber material which comprises a sectionally U-shaped flange gripping portion having an insert buried therein and gripping lip portions formed inside, and seal portions integrated with the flange gripping portion, wherein at least the gripping lip portions in the flange gripping portion are formed of microfoam rubber in which specific gravity of vulcanizate is in a range of from 0.9 to 1.0.

Preferably, if the microfoam rubber is provided to have the specific gravity of vulcanizate in a range of from 0.95 to 1.0, the aforementioned problem can be solved more easily.

Features and advantages of the invention will be evident from the following detailed description of the preferred embodiments described in conjunction with the attached drawings.

DETAILED DESCRIPTION OF THE PREFERRED EMBODIMENTS

Figure 1:
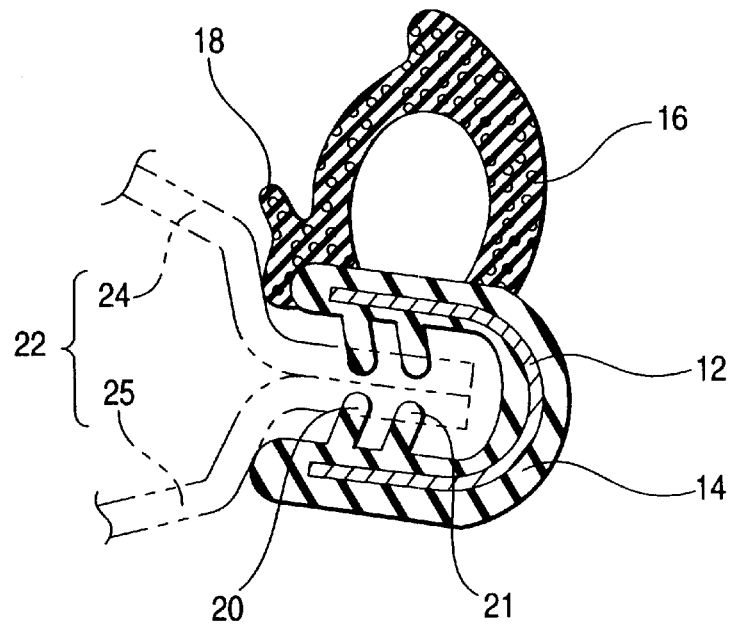
FIG. 1 is a sectional view of a door opening-trimming weather strip as an example of the present invention.

A weather strip having a flange gripping portion according to the present invention will be described below. Incidentally, mixture proportion and composition proportion in the following description are expressed by weight if no notice is given specially.

(1) The weather strip according to the present invention is basically formed of a rubber material having weather resistance and comprises a sectionally U-shaped flange gripping portion 14 and seal portions 16 and 18. The flange gripping portion 14 has a resin or metal insert 12 buried therein and gripping lip portions 20 and 21 formed inside. The seal portions 16 and 18 are integrated with the flange gripping portion 14 (see FIGS. 1 and 2). Further, the weather strip is fitted to a flange portion which is annularly formed, for example, in a circumferential edge of a door opening, or the like.

(2) The characteristic configuration of the weather strip according to the present invention is formed so that at least the gripping lip portions 20 and 21 in the flange gripping portion 14 are formed of microfoam rubber in which the specific gravity of vulcanizate is in a range of from 0.9 to 1.0 (preferably in a range of from 0.95 to 1.0, more preferably in a range of from 0.97 to 0.99). Further, the weather strip is generally formed by extrusion molding. Particularly, two-layers extrusion is used in view of extrusion-moldability so that the flange gripping portion 14 as a whole is formed of the aforementioned microfoam rubber whereas the seal portions 16 and 18 are formed of sponge rubber.

Incidentally, in the case where the flange gripping portion 14 except the gripping lip portions 20 and 21, that is, only the U-shaped portion (the trimming portion), is formed of a solid rubber composition whereas the gripping lip portions 20 and 21 are formed of microfoam rubber, three-layers extrusion is used because the seal portions 16 and 18 are formed of sponge rubber. In this case, although one extra extrusion equipment is required and productivity of the weather strip is slightly reduced, it is, however, possible to solve the aforementioned problem (consistency of the reduction of the largest insertion load with the security of the smallest extraction load).

If the microfoam rubber is foamed to an extent that the specific gravity of vulcanizate in the gripping lip portions 20 and 21 becomes too low, the smallest extraction load (the load required when the flange gripping portion is extracted from the thinnest region of the flange portion 22) is reduced in the same manner as in ordinary sponge rubber. As a result, it is difficult to secure the gripping force of the flange gripping portion. On the other hand, if the microfoam rubber is little foamed to an extent that the specific gravity of rubber vulcanizate in the microfoam rubber becomes too high, the largest insertion load (the load required when the flange gripping portion is inserted into the thickest region of the flange portion) is hardly set in a standard range in the same manner as in ordinary solid rubber. As a result, the workability in fitting the weather strip to the flange portion is lowered.

That is, the present inventors have found that, when at least the gripping lip portions 20 and 21 in the flange gripping portion 14 are formed of microfoam rubber with the specific gravity in a predetermined range, the tendency toward the increase of the insertion load in proportion to the increase of a pressure-contact margin between lips with respect to the flange portion (in the relation between the thickness of the flange portion and the gap between the lips) becomes the same as that in general-use sponge rubber (specific gravity: about 0.6 to 0.75), while the extraction load is little reduced compared with that in solid rubber (specific gravity: 1.1 to 1.2) even if the pressure-contact margin between the gripping lip portions is reduced. As a result, the inventors have hit on the present invention.

The reason is estimated as follows. The flange gripping portion, that is, gripping lip portions 20 and 21 are formed of microfoam rubber with the specific gravity in a predetermined range. When the flange portion is inserted into the flange gripping portion 14, since the end portions of the gripping lip portions 20 and 21 are soft, the end portions can escape and deform easily in the same manner as sponge rubber to thereby absorb the increase of bending resistance of the gripping lip portions 20 and 21. When the flange gripping portion 14 is contrariwise extracted from the flange portion, the contact area (the gripping area) of the flange gripping portion 14 with the flange portion 22 increases because of the bending of the end portions of the gripping lip portions 20 and 21 compared with that in solid rubber. As a result, the gripping force (resistance against extraction) little changes compared with that in the case of solid rubber even when the pressure-contact force due to a counterforce to the bending resistance becomes lower than that in the case of solid rubber. Incidentally, in the case of general-use sponge rubber, the rubber is so soft that the pressure-contact force is insufficient to contribute to the increase of the extraction load even if the contact area increases. This fact is supported by FIG. 3 which shows results of an examination of sheet metal insertion and extraction loads which will be described later.

Any material, such as ethylene-olefin rubber (generally, ethylene-propylene rubber), chloroprene rubber, or the like, can be used as the microfoam rubber without any special limitation so long as the material has specific gravity in a predetermined range and weather resistance necessary for the weather strip.

In view of extrusion-moldability, or the like, it is preferable to use an inorganic carrier and a heat-decomposable foaming agent with EPDM (ethylene-propylene-diene rubber) as a base polymer, and further, it is preferable to use crystalline PE (polyethylene) with a predetermined amount as a polymer component. On this occasion, not only the specific gravity (expansion ratio) can be adjusted easily to a range specified in the present invention but also a weather strip having a fine skin can be obtained easily. Accordingly, the flange gripping portion as a whole can be formed of one material desirably.

In the microfoam rubber composition, a heat-decomposable foaming agent is mixed through composite fine particles adsorbed and carried by an inorganic carrier.

The weather strip configured as described above is fitted to the annularly shaped flange portion 22 in the same manner as in the background art. On this occasion, even in the case where a single-ply region, a triple-ply region and a quadruple-play region are provided in addition to the double-ply region of the flange portion 22, the largest insertion load generated in the thickest region of the flange portion 22 can be prevented from increasing greatly, similarly to the general-use sponge rubber, so that the largest insertion load can fall within a standard value region because the gripping lip portions 20 and 21 in the flange gripping portion 14 are formed of microfoam rubber. Further, the smallest extraction load generated in the thinnest region of the flange portion can be also set to be not smaller than a standard value because the smallest extraction load is substantially the same as that in general-use solid rubber.

As described above, in the weather strip according to the present invention, the gripping lip portions in the flange gripping portion are formed of microfoam rubber in which the specific gravity of vulcanizate is in a range of from 0.9 to 1.0. Accordingly, the smallest extraction load (the load required when the flange gripping portion is extracted from the thinnest region of the flange portion) on the flange gripping portion can be secured while the largest insertion load (the load required when the thickest region of the flange portion is inserted into the flange gripping portion) is set in a standard range.

Further, the gripping lip portions are formed of microfoam rubber. Accordingly, the adaptability (tracing property) of the gripping lip portions to the flange portion increases, so that sealing property also increases.

Further, in the case where the whole of the flange gripping portion is formed of microfoam rubber, the flange gripping portion is rich in flexibility and small in elastic restoring characteristic in a longitudinal direction of the weather strip in comparison with the case where the flange gripping portion is formed of solid rubber. Accordingly, the workability in fitting the weather strip to the flange portion (particularly shaped three-dimensionally) of a corner portion increases. Furthermore, the weather strip becomes relatively light in weight as a whole. Accordingly, the workability in lifting and carrying the weather strip and fitting the weather strip to the flange portion of a roof portion, or the like, is also improved.

Further, in the case where the whole of the flange gripping portion is formed of microfoam rubber, the weight of the weather strip can be reduced in comparison with the case where the flange gripping portion is formed of solid rubber. Accordingly, the weather strip contributes to the improvement of the fuel cost of a vehicle after the weather strip is attached to the vehicle actually.

The present invention will be described below more specifically on the basis of a test example carried out to confirm the effect of the present invention.

<Preparation of Inorganic Carrier Foaming Agent>

10 g of a foaming agent OBSH (4,4'-oxy-bis(benzenesulfonyl-hydrazide)) and 90 g of calcium carbonate (particle size: 1.0 μm) were put into a compressional mixer and mixed in the condition of 1500 rpm×30 min to thereby prepare an inorganic carrier foaming agent.

<Preparation of Rubber Compositions>

Amounts of composite foaming agents shown in Table 1 were added according to mixture recipes shown in Table 1 by an ordinary kneader and roll milling method to thereby prepare solid, microfoam and sponge rubber compositions respectively.

<Preparation of Sample Pieces>

Figure 2:
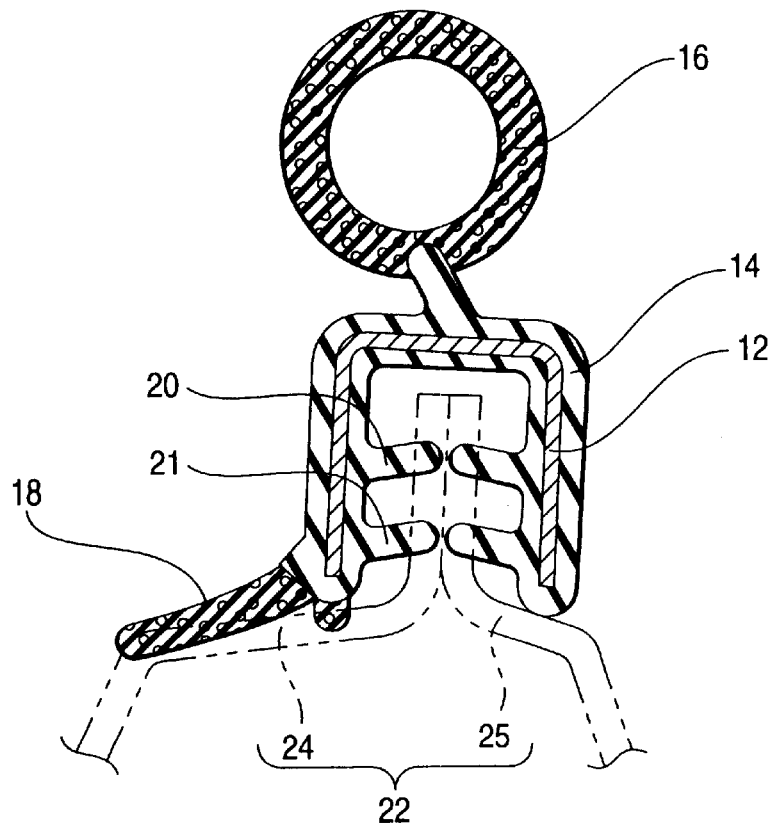
FIG. 2 is a sectional view of a trunk weather strip as another example of the present invention.

Each of the foam and solid rubber compositions prepared thus was extruded by an extruder (compression ratio: 1.5) (condition: an extruding rate of 14 m/min or 8 m/min) to form a sectionally flat plate having a metal insert buried therein as if the U-shaped flange gripping portion 14 in FIG. 1 was flattened. After UHF vulcanization (output: 6 kW×1 min) and hot-air vulcanization (220° C.×15 min), the extrudate having the flange gripping portion 14 bent so as to be sectionally U-shaped was cut into a length of 100 mm. Thus, respective sample pieces (weather strips) were prepared.

<Tests for Confirming the Effect of the Invention>

The respective sample pieces obtained thus were subjected to tests on the following items.

(1) Insertion Load: A 0.7 mm-thick metal plate (equivalent to the single-ply metal plate), a 2.1 mm-thick metal plate (equivalent to the double-ply or triple-ply metal plate) and a 3.4 mm-thick metal plate (equivalent to the triple-ply or quadruple-ply metal plate) were inserted in the flange gripping portion of each sample piece. Respective insertion loads on this occasion were measured by a tensile compression tester.

(2) Extraction Load: Respective loads required when the single-ply metal plate inserted in the flange gripping portion was extracted from the flange gripping portion were measured by a tensile compression tester.

(3) Specific Gravity: This was measured according to an underwater substitution method (JIS-K6301).

(4) Surface Hardness: This was measured according to a spring A-type (JIS-K6301).

(5) Surface Roughness: This was measured by a surface roughness tester ("SURFCOM 550A" made by Tokyo Seimitsu Co. Ltd.).

<Results of Tests>

Figure 3:
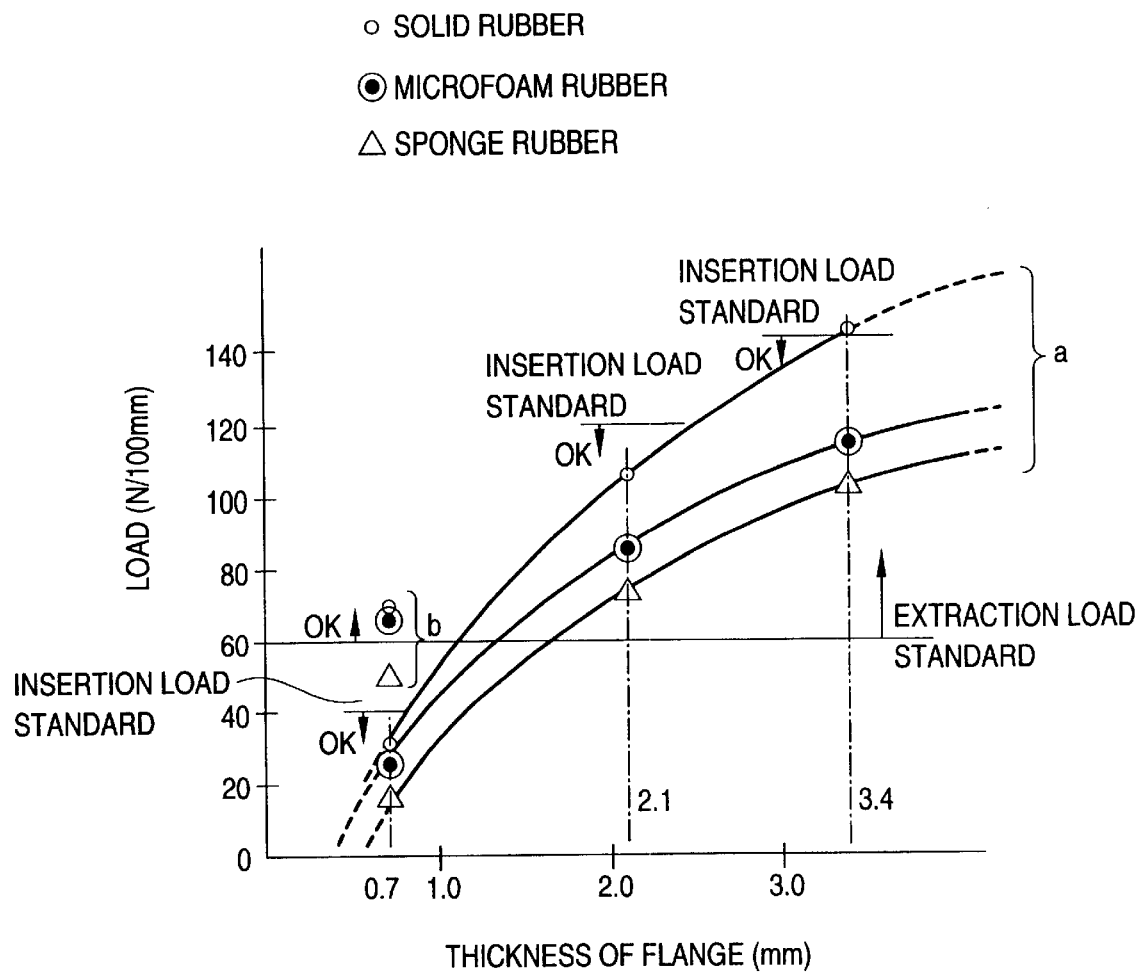
FIG. 3 is a graph showing results of measurement of the insertion loads required when metal plates having various plate thicknesses are inserted into the flange gripping portion in each of weather strips formed of various rubber compositions, and measurement of the extraction load required when a 0.7 mm-thick metal plate is extracted from the flange gripping portion.

From FIG. 3 showing results of the tests, it is apparent that the insertion load on the weatherstrip formed of microfoam rubber as an embodiment of the present invention increases in the same increasing rate as that on the weather strip formed of sponge rubber as the plate thickness increases, whereas the increasing rate proportional to the increase of the plate thickness in the weather strip formed of solid rubber is larger than those in the weather strips formed of microfoam rubber and sponge rubber according to the embodiment so that the weather strip formed of solid rubber does not satisfy the standard range of the insertion load in the case where the plate thickness is 3.4 mm ("a" in FIG. 3). It is further apparent that the extraction load (smallest extraction load) in the case of microfoam rubber according to this embodiment is near to that in the case of solid rubber and it satisfies a standard range of extracting force even in the case where the plate thickness is 0.7 mm ("b" in FIG. 3).

Incidentally, the gripping lip portions formed of sponge rubber do not satisfy the standard range of extracting force when the plate thickness is 0.7 mm.

Incidentally, in the weather strip formed of microfoam rubber as an embodiment of the present invention, the extraction load exhibits a standard value of not smaller than 60 N per 100 mm when the plate thickness of the flange portion having the strongest influence on the extraction load is small, that is, when the plate thickness of the flange is 0.7 mm. In this case, a sufficient flange gripping force can be secured.

On the other hand, the insertion load increases as the plate thickness of the flange portion increases. When, for example, the plate thickness of the flange portion is 3.4 mm, the insertion load exhibits a value of about 115 N per 100 mm which is greatly smaller than the standard value. The value is also smaller than 120 N per 100 mm which is a standard value of the insertion load in the case where the plate thickness of the flange portion is 2.1 mm.

Incidentally, both surface hardness and surface roughness as well as specific gravity are shown in Table 1 for reference.

TABLE 1

|  | Solid rubber | Microfoam rubber | Sponge rubber |
| --- | --- | --- | --- |
| EPDM polymer | 100 | 100 | 100 |
| Carbon black (MAF) | 140 | 140 | 140 |

TABLE 1-continued

|  | Solid rubber | Micro-foam rubber | Sponge rubber |
| --- | --- | --- | --- |
| Processed oil (paraffinic) | 60 | 60 | 60 |
| Zinc oxide | 5 | 5 | 5 |
| Stearic acid | 1 | 1 | 1 |
| Dehydrating agent (CaO) | 5 | 5 | 5 |
| Vulcanization accelerator | 3.5 | 3.5 | 3.5 |
| Foaming agent or inorganic carrier foaming agent | 0 | *1 2.0 | OBSH *2 5.0 |
| Specific gravity | 1.120 | 0.980 | 0.702 |
| $H_S$ (JIS A) | 66 | 65 | Could not be measured |
| $R_{ZD}$ ($\mu$) |  | 5.0 | 8.7 | 30 or more |

*1: The inorganic carrier foaming agent prepared in the above description.
*2: The same as OBSH used in the inorganic carrier foaming agent.

Figure 4:
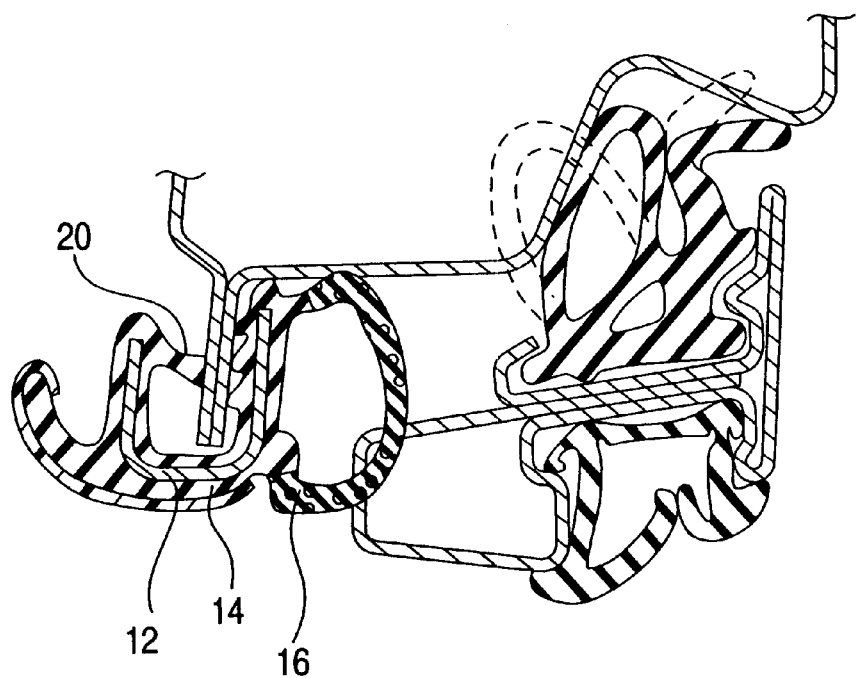
FIG. 4 is a sectional view of a door opening-trimming weather strip as still another example of the present invention.

FIG. 4 shows another example of a weather strip to which the present invention is applied. This is a weather strip for a door opening-trimming, and microfoam rubber according to the present invention is used for substantial whole of the U-shaped gripping portion 14.

Figure 5:
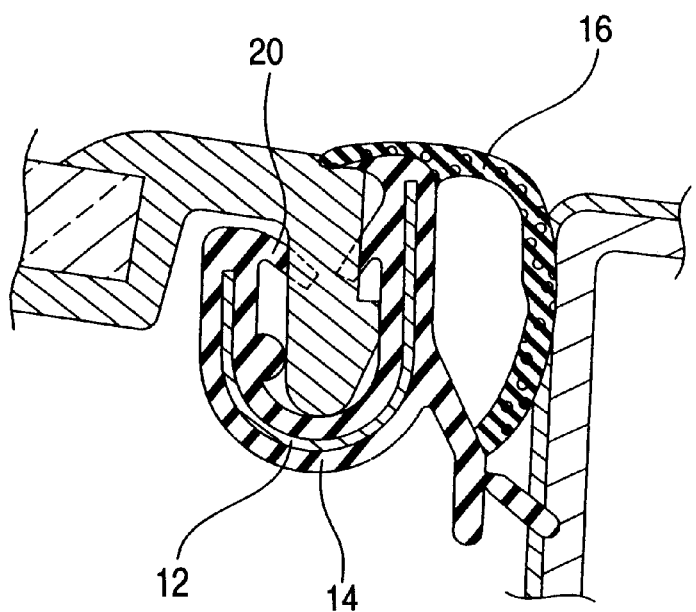
FIG. 5 is a sectional view of a shows still another example of a sliding-roof weather strip as still another example of the present invention.

FIG. 5 shows still another example of a weather strip strip to which the present invention is applied. This is a weather strip for a sliding roof, and microfoam rubber according to the present invention is also used for substantial whole of the U-shaped the gripping portion 14.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A weather strip comprising:

a sectional U-shaped flange gripping portion having an insert buried therein and a gripping lip portion formed inside thereof for gripping a flange portion of a door opening of an automobile body; and a seal portion integrated with said flange gripping portion, wherein the seal portion is provided on a side wall of said flange gripping portion, wherein said flange gripping portion is formed of microfoam rubber in which specific gravity of vulcanizate is in a range of from 0.97 to 0.99, an extraction load required when said flange gripping portion is extracted from the flange portion is not smaller than 60 N per 100 mm, and an insertion load required when said flange gripping portion is inserted onto the flange portion is not larger than 120 N per 100 mm when the flange portion has a plate thickness of 3.4 mm, the whole of said flange gripping portion including said gripping lip portion is formed of said microfoam rubber, and said microfoam rubber comprises ethylene-propylene-diene rubber as a base polymer, an inorganic carrier and a heat-decomposable foaming agent.

* * * * *